No. 696,778. Patented Apr. 1, 1902.
L. WEGLEIN, Jr.
MACHINE FOR MAKING ICE CREAM SANDWICHES.
(Application filed June 24, 1901.)
(No Model.)

Witnesses
Chas. K. Davies.
F. E. Stebbins.

Inventor
Louis Weglein Jr.
by Mark Willcox
Attorney

THE NORRIS PETERS CO., PHOTO-LITHO., WASHINGTON, D. C.

UNITED STATES PATENT OFFICE.

LOUIS WEGLEIN, JR., OF PHILADELPHIA, PENNSYLVANIA.

MACHINE FOR MAKING ICE-CREAM SANDWICHES.

SPECIFICATION forming part of Letters Patent No. 696,778, dated April 1, 1902.

Application filed June 24, 1901. Serial No. 65,888. (No model.)

*To all whom it may concern:*

Be it known that I, LOUIS WEGLEIN, Jr., a citizen of the United States, residing at Philadelphia, in the county of Philadelphia and State of Pennsylvania, have invented new and useful Improvements in Machines for Making Ice-Cream Sandwiches, of which the following is a specification.

The object of my invention is to make a convenient and effective device for making ice-cream sandwiches.

Figure 1:
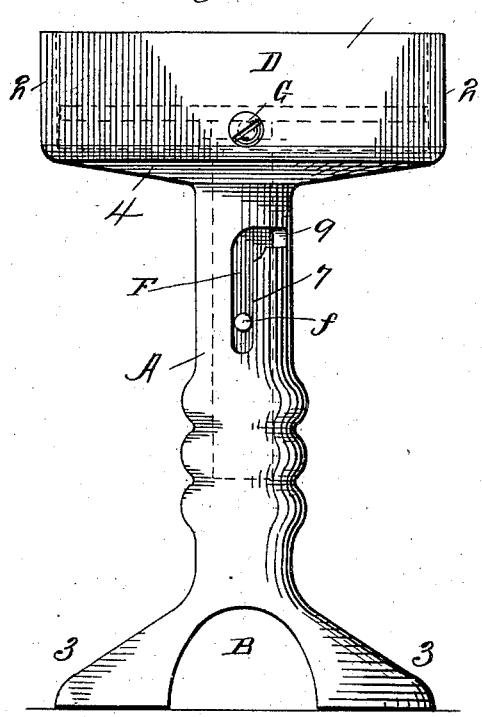
Figure 2:
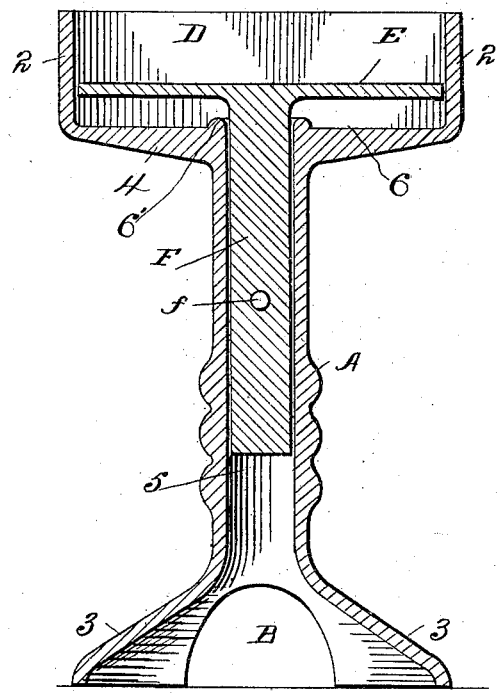
Figure 3:
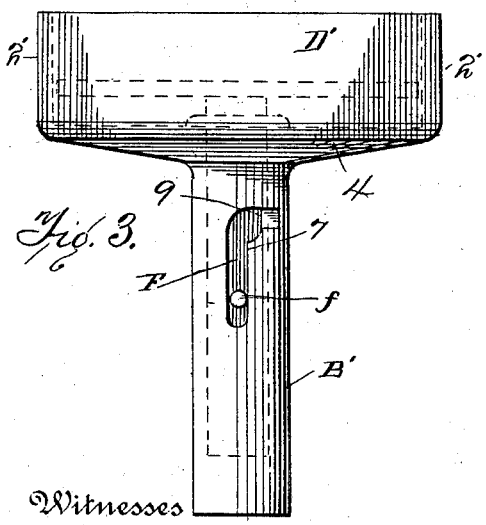
Figure 4:
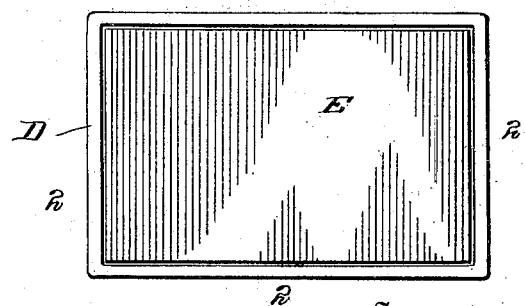

Figure 1 is a side elevation of my invented device. Fig. 2 is a vertical section of same, and Fig. 3 is a view of a modification, and Fig. 4 is a plan view of my invented device.

In my device the sandwich is formed in the box D, which has the movable false bottom E, by placing upon this bottom a cake or cracker or biscuit corresponding about in size and shape with the interior of the box, filling the box, which thus acts as a mold, on top of the cake with ice-cream, and placing the cake to form the upper layer above the ice-cream and pushing the sandwich out by lifting the false bottom.

The box D is formed with the side walls 2, 2 2 2 rising from the bottom wall 4, which is mounted upon the hollow or partly-hollow standard A. This standard is supported by a suitable base B, which is preferably formed of the two feet 3 3, which spread sufficiently to give steadiness to the device when supported by them. Inside the socket 5, formed by the hollow interior of the standard, is the spindle F, which is movable lengthwise therein and is secured to the false bottom E of the box D. This false bottom is movable outward and inward from the box and is movable with the spindle F and in practice can very conveniently be cast in one piece therewith. The spindle F is provided with means for moving it in the socket 5. This in practice consists of a pin projecting through a slot 7 in the walls of the standard A. The slot 7 is provided with a side extension 9, which allows the pin to be moved sidewise after the false bottom has been lifted a certain distance and the false bottom E turned across the pin. (See Fig. 1.)

I form the best form of my device in the following manner: I make one side of the slot to form a guide for the pin $f$ and the lower part of the side extension to form a rest for this pin, but cut away the bottom wall of the side extension 9, so that before the pin, if turned back, shall fit in the main part of slot 7 the false bottom E will rest upon the top of the side walls 2 2 2 2 of the box. A true bottom 6 of the box D can be formed and a raised dam 6' around the socket 5 can be provided to aid in preventing any portion of the ice-cream that may melt from flowing down the socket 5. A stop formed by a screw G is placed in one of the side walls 2 to adjust the depth at which the false bottom lies below the top of the box.

To operate my device, I first adjust the screw G, determine the thickness of the ice-cream layer, place on it the cake, put the ice-cream in the box, using it as a mold, place the second cake over the ice-cream. I then lift the sandwich upon the bottom E by raising pin $f$ and turn the pin into the extension 7, turning the spindle F and the bottom E, so that the sandwich is lifted completely out of the box D and is in a position to be easily manipulated. I prefer that the bottom wall of part of the extension 7 shall be sufficiently high to lift the bottom entirely clear of the box D, but that the part nearer the slot should be cut away, so that the bottom plate E will rest on the top of the walls 2 2 before it is turned sufficiently to fit within the box. The object of this is to prevent the person trying to remove the sandwich from the false bottom and it causing it to fall back again into the inside of the box.

In Fig. 3 the standard B' is intended to be held in the hand, and the walls 2' of the box E' are not provided with the adjustment and stop. This is a cheaper form of my device, and, while it does not possess all of the advantages of the first-described form of my device, is still in many respects efficient and desirable.

Having now described my invention, what I claim, and desire to secure by Letters Patent, is—

1. The combination of the hollow standard, provided with a socket; the box at the end of the standard; a false bottom in the box; a spindle movable in said socket and connected to the false bottom; a guide-slot in the walls of the standard and having a side offset, and a pin connected to the standard and movable in said slot, the length of the slot being sufficient with reference to the position of the pin, to allow the false bottom to be lifted entirely out of the box; substantially as described.

2. The combination of the hollow standard, provided with a socket; the box at the end of the standard; a false bottom in the box; a spindle movable in said socket, and connected with the false bottom; a guide-slot in the walls of the standard; a pin attached to said spindle and an offset at the side of said guide-slot, the portion of the bottom walls of which away from the guide-slot being higher than the portion nearest the guide-slot; substantially as described.

3. In an ice-cream-sandwich machine, the combination with the box having a vertically-movable false bottom, of a screw penetrating a wall of said box and being movable in and out of the line of motion of said false bottom; substantially as described.

4. In an ice-cream-sandwich machine, the combination of the vertical standard; the box supported on the standard; the socket in the standard; the vertically-movable false bottom of said box; the spindle moving in said socket connected to said false bottom; and the raised dam around the top of said socket; substantially as described.

In testimony whereof I affix my signature in presence of two witnesses.

LOUIS WEGLEIN, JR.

Witnesses:
 GEO. W. REED,
 M. W. COLLET.